United States Patent Office 3,526,630
Patented Sept. 1, 1970

3,526,630
ALKYL DIPIPERAZINE DERIVATIVES OF
XANTHENE-9-CARBOXYLIC ACID
Lajos Toldy, István Tóth, József Borsi, and István Polgári, Budapest, Hungary, assignors to Egyesult Gyogyszer-es Tapszergyar, Budapest, Hungary, a firm
No Drawing. Continuation-in-part of application Ser. No. 560,054, June 24, 1966. This application Apr. 18, 1969, Ser. No. 817,580
Claims priority, application Hungary, July 2, 1965, GO-957
Int. Cl. C07d 51/70
U.S. Cl. 260—268                                    7 Claims

ABSTRACT OF THE DISCLOSURE

Xanthenes having the formula

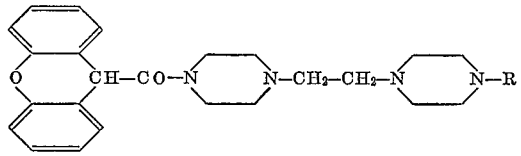

wherein R is normal or branched chain butyl, and the nontoxic acid addition salts thereof.

CROSS-REFERENCE TO PRIOR APPLICATION

This is a continuation-in-part of our copending application Ser. No. 560,054, filed June 24, 1966, and now abandoned.

SUMMARY OF THE INVENTION

This invention relates to new xanthene derivatives and their salts. More particularly, it relates to a group of compounds having the following Formula I

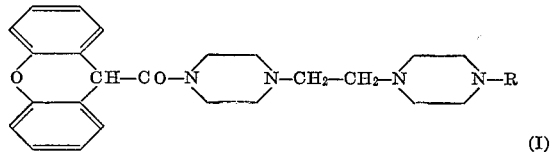 (I)

wherein R is selected from the group consisting of normal and branched chain butyl, and their nontoxic acid addition salts.

The invention includes all the stereoisomers and stereoisomeric mixtures of the compounds of the Formula I, not only in free base form but also their nontoxic acid salts.

The compounds of the present invention are conveniently prepared by reacting a compound of the Formula II

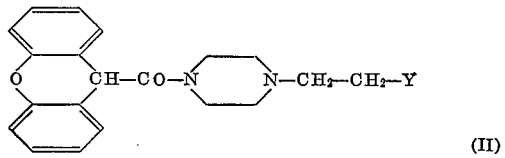 (II)

wherein Y is selected from the group consisting of halogen and sulphonyloxy, with a piperazine derivative of the Formula III

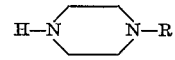 (III)

where R has the same meanings as above.

In accordance with a further embodiment of the invention, a compound of the Formula IV

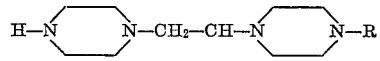 (IV)

wherein R has the same meanings as above, is reacted with a compound of the Formula V

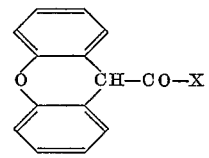 (V)

wherein X is selected from the group consisting of halogen, hydroxyl, alkoxy and azide.

Another embodiment of the invention for preparing the new compounds of the Formula I consists in reacting a compound of the Formula VI

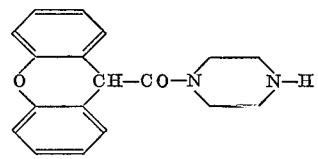 (VI)

with a compound of the Formula VII

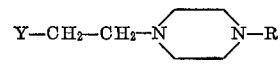 (VII)

wherein R and Y have the same meanings as above.

The new compounds of the Formula I possess basic properties and form acid salts upon reaction with inorganic and organic acids, such as hydrochloric, hydrobromic, maleic, fumaric, ethanesulphonic, 1,1'-methylene-bis - (2 - naphthol - 3 - carboxylic), sulphuric, phosphoric, acetic, citric and other pharmaceutically acceptable acids.

The above-described reactions for producing the new compounds of the present invention are conveniently carried out without or with an inert solvent, preferably in the presence of an acid-binding agent.

The compounds of this invention possess valuable pharmacological properties. Thus, the present compounds are useful antiulcer agents. This activity is demonstrated by their inhibition of ulceration in rats. Moreover, they show an anticholinergic activity.

In the following table the activity of the compounds according to the invention to inhibit the ulcerous state as caused by restrain, insulin, reserpine and the method of Shay, that is, by ligating the pylorus, is compared to the activity of the known compound methantheline bromide (β - diethylaminoethyl - 9 - xanthene - carboxylate methobromide). On the basis of this comparison it can be stated that the compounds according to the invention are considerably less toxic and show very good resorption from the gastro-intestinal tract. The excellent antiulcer effect of these compounds can probably be explained by the fact that in contradistinction to the quaternary compounds previously used in these therapies, the compounds according to the invention cross the blood serum barrier and act on the brain where, due to their central anticholinergic activity, they modify the activity of the vegetative centers. Thus, the therapeutical value of the compounds according to the invention consists mainly in that, by virtue of their central and peripheral anticholinergic effect, they inhibit the ulcerous gastric state. Electroencephalographic experiments performed on rabbits with the compounds according to the invention have shown that changes in the electric potential of the brain as produced with physostigmine could be readily inhibited with these compounds, while methantheline bromide showed no such effect, using the quantities conventional for such compounds, e.g., 5–10 mg./kg.

The 1 - (xanthene - 9' - carbonyl) - 4 - β - [4" - isobutyl) - piperazinyl - 1"] - ethyl - piperazine inhibits in dogs the secretion of gastric acid as caused by "Gastrine."

chloride in 80 ml. of dry dichloroethane is dropped to the above-mentioned solution. After standing for a night, the separated triethyl-amine chlorohydrate is filtered. The filtrate is shaken with aqueous sodium hydrogen carbonate solution and then with water, and the dichloroethane is evaporated. The residue is dissolved in a 1:1 mixture of abs. benzene and abs. ether, whereafter the 1-(xanthene-9' - carbonyl) - 4 - (β - oxyethyl) - piperazine chlorohydrate is precipitated with abs. ethanol containing hydrochloric acid. This product melts, after recrystallization from abs. methanol, at 245–247° C.

41.5 g. of this oxyethyl compound is mixed with chloroform and a 10% aqueous potassium carbonate solution, whereafter the chloroformic layer is dried over sodium sulphate and evaporated. The residue is dissolved in dry chloroform, and while boiling and stirring the solution of 11.5 ml. of thionyl chloride in 20 ml. of dry chloroform is added during 1½ hours. After boiling for further 3

TABLE.—ANTIULCER ACTIVITY AND TOXICITY OF THE COMPOUNDS ACCORDING TO THE INVENTION AS COMPARED TO THAT OF METHANTHELINE BROMIDE

| Name of the compounds | Restrain | Insulin | Reserpine | Shay | LD$_{50}$ I.v. | P.o. | LD$_{50}$ p.o./i.v. |
|---|---|---|---|---|---|---|---|
| 1-(xanthene-9'-carbonyl)-4-β-[4"-(n-butyl)-piperazinyl-1"]-ethyl-piperazine hydrochloride | 12.8 | 10.5 | 19.0 | 19.0 | 65.0 | 596 | 9.2 |
| 1-(xanthene-9'-carbonyl)-4-β-[4"-(isobutyl)-piperazinyl-1"]-ethyl-piperazine hydrocholride | 9.6 | 7.0 | 6.0 | 8.0 | 68.0 | 490 | 7.2 |
| 1-(xanthene-9'-carbonyl)-4-β-[4"-(sec. isobutyl)-piperazinyl-1"]-ethyl-piperazine hydrochloride | 23.0 | 3.8 | 10.5 | 7.0 | 76.0 | 1,100 | 14.4 |
| Methantheline bromide | 20.7 | 11.5 | 30 | 15.2 | 3.4 | 320 | 95.6 |

I.v.—Intravenously, p.o.—per os.

As indicated above, the products of the invention occur in both the free base and acid salt forms. In some instances it can be desirable to obtain the acid salt or the quaternary derivative from the free base. In this case, the salt can be prepared by reacting the free base with the corresponding acid, preferably in the presence of a suitable solvent permitting isolation of the salt.

On the other hand, in those instances where it is desired to convert the acid salt to the base, this can be accomplished by dissolving the salt in a suitable solvent, neutralizing the solution with a basic material, such as sodium hydroxide and the like, and isolating the desired base by extraction or other suitable means.

The invention is further illustrated by the aid of the following examples which are given for the purpose of illustration only and are not to be construed as limit of invention in spirit or in scope.

EXAMPLE 1

12.1 g. of 1 - (xanthene - 9' - carbonyl) - 4 - (β - chloroethyl) - piperazine are stirred with 14.2 g. of N - (n - butyl)-piperazine at 135° C. for 3 hours. The cooled reaction mixture is treated with a 10% aqueous sodium carbonate solution, thereafter it is decanted and then washed with water by decantation. The residue is dissolved in chloroform, dried over sodium sulphate and the chloroform distilled off under vacuum. The base obtained as residue is dissolved in 120 ml. of abs. ethanol and the 1-(xanthene-9' - carbonyl) - 4 - β - [4" - (n - butyl) - piperazinyl - 1"]-ethyl-piperazine trichlorohydrate is precipitated with abs. ethanol containing hydrochloric acid. The obtained compound melts, after boiling with abs. methanol, at 278–280° C., with decomposition.

This compound is mixed with chloroform and a 10% aqueous potassium carbonate solution. The chloroformic layer is dried over sodium sulphate and evaporated. The obtained raw base melts, after recrystallizing from acetone, at 104° C.

The 1 - (xanthene - 9' - carbonyl) - 4 - (β - chloroethyl)-piperazine used as starting compound is prepared in the following way: to a solution of 16.6 g. of N-(β-oxyethyl)-piperazine in 120 ml. of dry dichloroethane, 23.5 ml. of triethylamine are added and while cooling and stirring, the solution of 33.9 g. of xanthene-9'-carboxylic acid hours, about ⅔ part of the chloroform are distilled off in vacuo, and after giving acetone to the residue, the chlorohydrate of 1-(xanthene-9'-carbonyl)-4-(β-chloroethyl)-piperazine is precipitated. This product is separated, mixed while cooling with chloroform and aqueous sodium hydrogen carbonate solution, whereafter the chloroformic layer is separated, dried over sodium sulphate, and the chloroform is distilled og. The obtained 1-(xanthene-9'-carbonyl)-4-(β-chloroethyl)-piperazine melts, after recrystallization from 7:3 mixture of abs. benzene and petroether, at 127–129° C.

EXAMPLE 2

One proceeds as described in Example 1, with the difference, that, instead of N-(n-butyl)-piperazine, N-isobutylpiperazine is used. The obtained 1-(xanthene-9'-carbonyl)-4-β-[4"-(isobutyl-piperazinyl-1"]-ethyl - piperazine trichlorohydrate melts, after boiling with abs. methanol, at 278–280° C. with decomposition.

EXAMPLE 3

One proceeds as described in Example 1, with the difference, that, instead of N-(n-butyl)-piperazine, N-(sec. isobutyl)-piperazine is used. The obtained 1-(xanthene-9'-carbonyl)-4β-[4"-(sec. isobutyl) - piperazinyl-1"]-ethyl-piperazine trichlorohydrate melts, after boiling with abs. methanol, at 268–270° C.

What we claim is:
1. Xanthenes of the formula

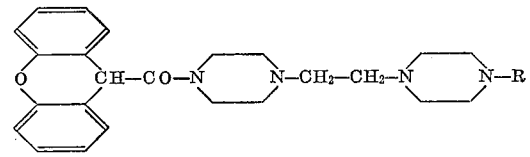

wherein R is a member selected from the group consisting of normal and branched chain butyl and homogeneous and nontoxic acid addition salts thereof.

2. A xanthene as claimed in claim 1, in which R is n-butyl.

3. Hydrochlorides of the xanthene as claimed in claim 2.

4. A xanthene as claimed in claim 1, in which R is isobutyl.

5. Hydrochlorides of the xanthene as claimed in claim 4.

6. A xanthene as claimed in claim 1, in which R is sec. isobutyl.

7. Hydrochlorides of the xanthene as claimed in claim 6.

References Cited

UNITED STATES PATENTS 2,742,472   4/1956   Baltzly et al.   260—268
3,262,934   7/1966   Cusic et al.   260—268

DONALD G. DAUS, Primary Examiner.

U.S. Cl. X.R.

424—250